US012592027B2

(12) United States Patent
Chen et al.

(10) Patent No.: US 12,592,027 B2
(45) Date of Patent: Mar. 31, 2026

(54) THREE-DIMENSIONAL RECONSTRUCTION METHOD, THREE-DIMENSIONAL RECONSTRUCTION APPARATUS AND STORAGE MEDIUM

(71) Applicant: BYTEDANCE INC., Los Angeles, CA (US)

(72) Inventors: Zhili Chen, Los Angeles, CA (US); Linjie Luo, Los Angeles, CA (US)

(73) Assignee: BYTEDANCE INC., Los Angeles, CA (US)

( * ) Notice: Subject to any disclaimer, the term of this patent is extended or adjusted under 35 U.S.C. 154(b) by 325 days.

(21) Appl. No.: 18/251,224

(22) PCT Filed: Jul. 29, 2021

(86) PCT No.: PCT/CN2021/109185
§ 371 (c)(1),
(2) Date: Apr. 28, 2023

(87) PCT Pub. No.: WO2022/088799
PCT Pub. Date: May 5, 2022

(65) Prior Publication Data
US 2023/0394756 A1      Dec. 7, 2023

(30) Foreign Application Priority Data
Oct. 29, 2020    (CN) .......................... 202011177193.X

(51) Int. Cl.
*G06T 17/00*        (2006.01)
*G06T 19/20*        (2011.01)
(52) U.S. Cl.
CPC .................................... *G06T 17/00* (2013.01)
(58) Field of Classification Search
CPC ..... G06T 17/00; G06T 19/20; G06T 2210/56;
G06T 2219/012; G06T 2219/2016
See application file for complete search history.

(56) References Cited

U.S. PATENT DOCUMENTS 5,963,613 A * 10/1999 Navab .................. A61B 6/4441
378/4
8,880,535 B1 * 11/2014 Agarwal ........... G06F 16/24578
707/748
(Continued)

FOREIGN PATENT DOCUMENTS

CN        105157609 A      12/2015
CN        107884767 A      4/2018
(Continued)

OTHER PUBLICATIONS

International Search Report issued Oct. 20, 2021 in International Application No. PCT/CN2021/109185, with English translation (7 pages).

(Continued)

*Primary Examiner* — Xiao M Wu
*Assistant Examiner* — Latrell Anthony Creary

(57)              ABSTRACT

Provided are three-dimensional reconstruction method, apparatus, and storage medium. The method includes: obtaining input images each including a target object, and obtaining coordinates of first positions, in a geodetic coordinate system, of an image capturing device corresponding to the input images; constructing a reconstruction coordinate system based on the input images, and performing a three-dimensional reconstruction processing for the target object based on the reconstruction coordinate system, to obtain a first three-dimensional reconstruction model of the target object and coordinates of second positions, in the reconstruction coordinate system, of the image capturing device corresponding to the input images; and performing a transformation processing on at least part of points in the first three-dimensional reconstruction model based on the coordinates of the first positions and the coordinates of the (Continued)

S10 — Obtaining a plurality of input images each including a target object, and obtaining coordinates of a plurality of first positions, in a geodetic coordinate system, of an image capturing device corresponding to the plurality of input images S11 — Constructing a reconstruction coordinate system based on the plurality of input images, and performing a three-dimensional reconstruction processing for the target object based on the reconstruction coordinate system, to obtain a first three-dimensional reconstruction model of the target object and coordinates of a plurality of second positions, in the reconstruction coordinate system, of the image capturing device corresponding to the plurality of input images S12 — Performing a transformation processing on at least part of points in the first three-dimensional reconstruction model based on the coordinates of the plurality of first positions and the coordinates of the plurality of second positions to obtain a second three-dimensional reconstruction model second positions to obtain a second three-dimensional reconstruction model.

20 Claims, 3 Drawing Sheets

(56)  References Cited

U.S. PATENT DOCUMENTS

| | | | | |
|---|---|---|---|---|
| 2008/0181486 A1* | 7/2008 | Spooner | ........... | G06T 7/55 |
| | | | | 382/154 |
| 2009/0096790 A1* | 4/2009 | Wiedemann | ........... | B25J 9/1692 |
| | | | | 345/427 |
| 2017/0243399 A1 | 8/2017 | Troy et al. | | |
| 2018/0051982 A1 | 2/2018 | Yin | | |
| 2018/0240264 A1 | 8/2018 | Ito | | |
| 2019/0325089 A1* | 10/2019 | Golparvar-Fard | .... | G06T 19/003 |
| 2020/0081105 A1* | 3/2020 | Zhou | ........... | G06T 7/80 |
| 2020/0349735 A1* | 11/2020 | Dine | ........... | G06T 7/74 |
| 2021/0383147 A1* | 12/2021 | Rajaraman | ........... | G06V 40/172 |
| 2022/0185271 A1* | 6/2022 | Cheng | ........... | G06V 20/54 |
| 2022/0249168 A1* | 8/2022 | Besier | ........... | A61B 34/10 |

FOREIGN PATENT DOCUMENTS

| | | | |
|---|---|---|---|
| CN | 108122280 | A | 6/2018 |
| CN | 108413917 | A | 8/2018 |
| CN | 108717728 | A | 10/2018 |
| CN | 109035321 | A | 12/2018 |
| CN | 109708618 | A | 5/2019 |
| CN | 109754429 | A | 5/2019 |
| CN | 111161336 | A | 5/2020 |
| CN | 111311743 | A | 6/2020 |
| CN | 111508058 | A | 8/2020 |
| CN | 111598993 | A | 8/2020 |
| CN | 111707187 | A | 9/2020 |
| CN | 111815757 | A | 10/2020 |
| CN | 112288853 | A | 1/2021 |

OTHER PUBLICATIONS

Written Opinion for International Application No. PCT/CN2021/109185, mailed Oct. 20, 2021, 9 Pages.
Notice of Decision of Granting Patent Right for Invention issued May 26, 2023 in CN Application No. 202011177193.X, with English translation (15 pages).

* cited by examiner

| S10 | Obtaining a plurality of input images each including a target object, and obtaining coordinates of a plurality of first positions, in a geodetic coordinate system, of an image capturing device corresponding to the plurality of input images |
|---|---|
| S11 | Constructing a reconstruction coordinate system based on the plurality of input images, and performing a three-dimensional reconstruction processing for the target object based on the reconstruction coordinate system, to obtain a first three-dimensional reconstruction model of the target object and coordinates of a plurality of second positions, in the reconstruction coordinate system, of the image capturing device corresponding to the plurality of input images |
| S12 | Performing a transformation processing on at least part of points in the first three-dimensional reconstruction model based on the coordinates of the plurality of first positions and the coordinates of the plurality of second positions to obtain a second three-dimensional reconstruction model |

FIG. 1

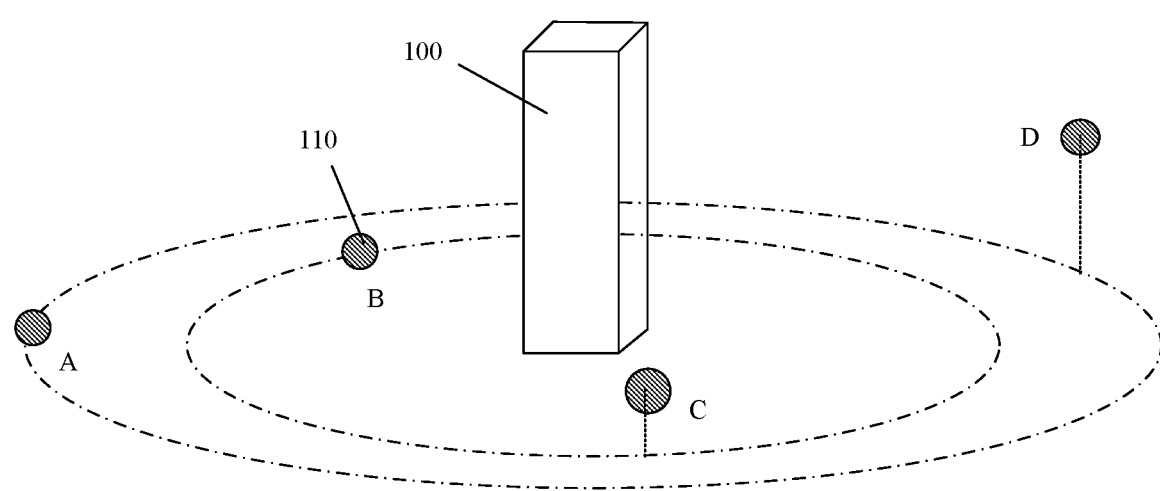

Computer-readable
instructions

Storage medium

300

600

| Processing unit 601 | ROM 602 | RAM 603 |

604

I/O interface 605

Input unit 606 | Output unit 607 | Storage unit 608 | Communication unit 609

THREE-DIMENSIONAL RECONSTRUCTION METHOD, THREE-DIMENSIONAL RECONSTRUCTION APPARATUS AND STORAGE MEDIUM

CROSS REFERENCE TO RELATED APPLICATIONS

The present application claims priority to Chinese Patent Application No. 202011177193.X, entitled "THREE-DIMENSIONAL RECONSTRUCTION METHOD, THREE-DIMENSIONAL RECONSTRUCTION APPARATUS AND STORAGE MEDIUM" and filed on Oct. 29, 2020, the entire disclosure of which is incorporated herein by reference.

FIELD

Embodiments of the present disclosure relate to a three-dimensional reconstruction method, a three-dimensional reconstruction apparatus, and a non-transitory computer-readable storage medium.

BACKGROUND

As Artificial Intelligence (AI) technology is widely used in production and life, three-dimensional reconstruction and three-dimensional model post-processing technologies, as a key component of the vision part of AI, are becoming a hot topic of discussion among researchers. Currently, since multi-view-based three-dimensional reconstruction algorithms are relatively mature, models obtained by such reconstruction can reflect features of real-world objects satisfyingly. However, accuracy, speed, and user experience are still the most important indicators to be optimized in multi-view three-dimensional reconstruction solutions.

SUMMARY

This summary is provided to present concepts in a brief form, and these concepts will be described in detail later in the section of detailed description. This summary is neither intended to identify key or essential features of the claimed technical solutions, nor to limit the scope of the claimed technical solutions.

According to at least one embodiment of the present disclosure, a three-dimensional reconstruction method is provided. The three-dimensional reconstruction method includes: obtaining a plurality of input images each including a target object, and obtaining coordinates of a plurality of first positions, in a geodetic coordinate system, of an image capturing device corresponding to the plurality of input images; constructing a reconstruction coordinate system based on the plurality of input images, and performing a three-dimensional reconstruction processing for the target object based on the reconstruction coordinate system, to obtain a first three-dimensional reconstruction model of the target object and coordinates of a plurality of second positions, in the reconstruction coordinate system, of the image capturing device corresponding to the plurality of input images; and performing a transformation processing on at least part of points in the first three-dimensional reconstruction model based on the coordinates of the plurality of first positions and the coordinates of the plurality of second positions to obtain a second three-dimensional reconstruction model.

According to at least one embodiment of the present disclosure, a three-dimensional reconstruction apparatus is provided. The three-dimensional reconstruction apparatus includes: a memory configured to store computer-readable instructions in a non-transitory manner; and a processor configured to execute the computer-readable instructions. The computer-readable instructions, when executed by the processor, implement the three-dimensional reconstruction method according to any of the embodiments of the present disclosure.

According to at least one embodiment of the present disclosure, a non-transitory computer-readable storage medium is provided. The non-transitory computer-readable storage medium has computer-readable instructions stored thereon. The computer-readable instructions, when executed by a processor, implement the three-dimensional reconstruction method according to any of the embodiments of the present disclosure.

BRIEF DESCRIPTION OF THE DRAWINGS

The above and other features, advantages, and aspects of various embodiments of the present disclosure will become more apparent in conjunction with the accompanying drawings and with reference to the following specific embodiments. Throughout the drawings, same or similar elements are denoted by same or similar reference numerals. It should be understood that the drawings are schematic, and components and elements are not necessarily drawn to scale.

FIG. 1 is a schematic flowchart of a three-dimensional reconstruction method according to at least one embodiment of the present disclosure;

FIG. 2 is a schematic diagram of capturing input images at different positions according to some embodiments of the present disclosure;

DETAILED DESCRIPTION

Figure 3:
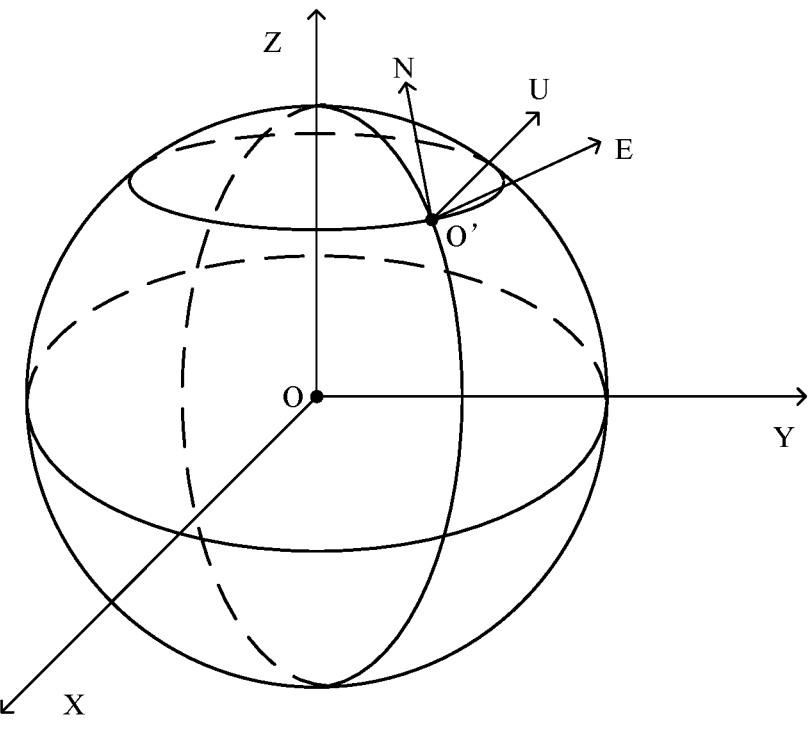
FIG. 3 is a schematic diagram of a geodetic coordinate system and an intermediate coordinate system according to some embodiments of the present disclosure.

Embodiments of the present disclosure will be described in detail below with reference to the accompanying drawings. Although some embodiments of the present disclosure are illustrated in the drawings, it should be understood that the present disclosure may be embodied in various forms and should not be construed as being limited to the embodiments set forth herein. Instead, these embodiments are provided for a complete and thorough understanding of the present disclosure. It should be understood that the drawings and embodiments of the present disclosure are only used for exemplary purposes, rather than to limit the protection scope of the present disclosure.

It should be understood that various steps described in the method embodiments of the present disclosure may be executed in a different sequence and/or in parallel. In addition, the method embodiments may include additional steps and/or omit executions of the illustrated steps. The scope of the present disclosure is not limited in this respect.

The term "include" and its variants as used herein indicate open-ended inclusions, i.e., "include but not limited to". The term "based on" refers to "at least partially based on". The term "one embodiment" means "at least one embodiment"; the term "another embodiment" means "at least one additional embodiment", and the term "some embodiments" means "at least some embodiments". Related definitions of other terms will be given in the following description.

It should be noted that concepts such as "first" and "second" mentioned in the present disclosure are only used to distinguish different apparatuses, modules, or units, rather than to limit a sequence or interdependence of functions performed by these apparatuses, modules, or units.

It should be noted that modifications such as "a" and "plurality of" mentioned in the present disclosure are schematic instead of restrictive, and should be construed as "one or more" by those skilled in the art, unless clearly indicated otherwise in the context.

Names of messages or information exchanged between a plurality of apparatuses in the embodiments of the present disclosure are only used for illustrative purposes, and are not intended to limit the scope of these messages or information.

Currently, to measure an actual scale of a reconstructed three-dimensional model, either three-dimensional reconstruction technologies solely using a vision-based Structure From Motion (SFM) algorithm, or three-dimensional reconstruction technologies using a visual Simultaneous Localization and Mapping (SLAM) method combining positioning and navigation techniques with vision methods, needs to measure a distance between two points on an object in the real word and a distance between two points at the same positions on the reconstructed three-dimensional model, and then scale the reconstructed three-dimensional model using a ratio between the distance between the two points on the object in the real world and the distance between the two points on the reconstructed three-dimensional model, to allow a scale of the processed three-dimensional model to be consistent with a scale of the object in the real world. However, since design drawings of some objects (e.g., some buildings) in the real world are not readily available and it is difficult to measure these objects in the field, the above methods may not be able to obtain the actual scale of the three-dimensional model.

According to at least one embodiment of the present disclosure, a three-dimensional reconstruction method, a three-dimensional reconstruction apparatus, and a non-transitory computer-readable storage medium are provided. The three-dimensional reconstruction method includes: obtaining a plurality of input images each including a target object, and obtaining coordinates of a plurality of first positions, in a geodetic coordinate system, of an image capturing device corresponding to the plurality of input images; constructing a reconstruction coordinate system based on the plurality of input images, and performing a three-dimensional reconstruction processing for the target object based on the reconstruction coordinate system, to obtain a first three-dimensional reconstruction model of the target object and coordinates of a plurality of second positions, in the reconstruction coordinate system, of the image capturing device corresponding to the plurality of input images; and performing a transformation processing on at least part of points in the first three-dimensional reconstruction model based on the coordinates of the plurality of first positions and the coordinates of the plurality of second positions to obtain a second three-dimensional reconstruction model.

With the three-dimensional reconstruction method, the actual scale of the three-dimensional reconstruction model can be calculated based on the coordinates of the plurality of first positions, in the geodetic coordinate system, of the image capturing device corresponding to the plurality of input images (i.e., Global Positioning System (GPS) information of the image capturing device corresponding to the input images) to obtain an actual scale of the three-dimensional reconstruction model simply and quickly, the actual scale having a high accuracy.

For example, obtaining the actual scale of the three-dimensional reconstruction model mainly has the following uses. First, it is beneficial to design materials based on the actual scale of the three-dimensional reconstruction model, e.g., a size of a virtual character material relative to a size of a building, to improve fit between the material and a real target object. Second, in applications of landmark Augmented Reality (AR) special effects, the three-dimensional reconstruction method provided by the present disclosure can be combined with an SLAM system for position tracking of a camera on a cell phone. The SLAM system can return a real time position, relative to the actual scale of the target object, of a current camera, which can be incorporated and used to calculate a viewing angle of the current camera and render an AR material having a correct relative position to the building. It should be noted that the three-dimensional reconstruction method according to the embodiments of the present disclosure may be applied to the three-dimensional reconstruction apparatus according to the embodiments of the present disclosure. The three-dimensional reconstruction apparatus may be configured on a display device. For example, the three-dimensional reconstruction apparatus may also be configured in an application of the display device. The display device may be a personal computer, a mobile terminal, etc. The mobile terminal may be a hardware device having various operating systems, such as a cell phone, a tablet computer, etc. The application may be TikTok, etc.

Embodiments of the present disclosure are described in detail below in conjunction with the accompanying drawings, but the present disclosure is not limited to these specific embodiments. It should be noted that detailed descriptions of some known functions and known components are omitted in the present disclosure to provide the following clear and concise description of the embodiments of the present disclosure.

FIG. 1 is a schematic flowchart of a three-dimensional reconstruction method according to at least one embodiment of the present disclosure.

For example, as illustrated in FIG. 1, the three-dimensional reconstruction method includes steps S10 to S12.

At step S10, a plurality of input images each including a target object is obtained, and coordinates of a plurality of first positions, in a geodetic coordinate system, of an image capturing device corresponding to the plurality of input images is obtained.

At step S11, a reconstruction coordinate system is constructed based on the plurality of input images, and a three-dimensional reconstruction processing for the target object is performed based on the reconstruction coordinate system, to obtain a first three-dimensional reconstruction model of the target object and coordinates of a plurality of second positions, in the reconstruction coordinate system, of the image capturing device corresponding to the plurality of input images.

At step S12, a transformation processing is performed on at least part of points in the first three-dimensional reconstruction model based on the coordinates of the plurality of first positions and the coordinates of the plurality of second positions to obtain a second three-dimensional reconstruction model.

For example, at step S10, the plurality of input images is in one-to-one correspondence with the coordinates of the plurality of first positions.

For example, the input images may be obtained by the image capturing device. The image capturing device is configured to capture images and/or videos, etc. The image capturing device may include a camera, a camcorder, or the like.

For example, in some embodiments, 1,000 input images may be obtained. However, the present disclosure includes, but is not limited to, such an example. 800, 1,200, or other numbers of input images may be obtained. The number of the plurality of input images may be determined according to actual situations.

For example, the input image may be an image captured in real time by the image capturing device, or an image that is captured and stored in advance. For example, the target object included in the input image may include an outdoor object such as a landmark building (e.g., Yueyang Tower in Yueyang city, Tengwang Pavilion in Nanchang city, Yellow Crane Tower in Wuhan city, Taikoo Li in Sanlitun in Beijing, etc.), an indoor object such as a table and a cabinet, a natural scene such as a California redwood tree, etc. For example, the target object may be an outdoor object having a relatively large size, so that coordinates of a first position of a stable image capturing position may be obtained.

For example, the plurality of input images may be captured by a same image capturing device, and the coordinates of the plurality of first positions indicate positions of the image capturing device when capturing the plurality of input images. However, the present disclosure is not limited to such an example. The plurality of input images may alternatively be captured by different image capturing devices.

FIG. 2 is a schematic diagram of capturing input images at different positions according to some embodiments of the present disclosure.

For example, as illustrated in FIG. 2, a target object 100 may be an edifice. The image capturing device 110 may capture images of the target object 100 at different positions (e.g., positions A, B, C, and D illustrated in FIG. 2) to obtain the plurality of input images. Position A, position B, position C, and position D each correspond to coordinates of a different first position. As illustrated in FIG. 2, position A and position B are located on a left side of the target object 100, position D is located on a right side of the target object 100, and position C is located in front of the target object 100. A distance between position A and the target object 100 may be equal to a distance between position D and the target object 100. A distance between position B and the target object 100 may be equal to a distance between position C and the target object 100. The distance between position A and the target object 100 is greater than the distance between position B and the target object 100. A height of position A and a height of position B are the same, both of which are smaller than a height of position C. The height of position C is smaller than a height of position D.

It should be noted that the positions A, B, C, and D illustrated in FIG. 2 are only schematic, and "left side" and "right side" are distinguished from a perspective of the front of the target object 100.

FIG. 3 is a schematic diagram of a geodetic coordinate system and an intermediate coordinate system according to some embodiments of the present disclosure.

For example, as illustrated in FIG. 3, the geodetic coordinate system is represented as coordinate system OXYZ, which is a coordinate system established in geodetic survey with a reference ellipsoidal plane as a reference plane. In the geodetic coordinate system OXYZ, a position of a ground point is expressed by a geodetic longitude (i.e., longitude), a geodetic latitude (i.e., latitude), and a geodetic altitude (i.e., altitude). For example, the geodetic coordinate system OXYZ may be a WGS-84 coordinate system or a GCJ-02 coordinate system. For example, an X-axis of the WGS-84 coordinate system is directed to an intersection of the zero meridian plane (Greenwich) and the equator of the Conventional Terrestrial Pole (CTP) as defined in Bureau International de l'Heure (BIH, an international time service institution) 1984.0, a Z-axis is directed to the CTP direction, and a Y-axis forms a right-handed coordinate system with the X and Z-axes.

For example, at step S10, said obtaining the coordinates of the plurality of first positions, in the geodetic coordinate system, of the image capturing device corresponding to the plurality of input images includes: reading a plurality of pieces of position data, which are recorded by the image capturing device at respective times when capturing the plurality of input images, and obtaining the coordinates of the plurality of first positions based on the plurality of pieces of position data.

For example, the plurality of pieces of position data is determined by a satellite positioning system. For example, when the plurality of input images is captured by the image capturing device, the plurality of pieces of position data corresponding to the image capturing device is captured in real time by the satellite positioning system. The coordinates of the plurality of first positions corresponding to the image capturing device are then obtained based on the plurality of pieces of position data.

For example, the satellite positioning system may include Global Positioning System (GPS), BeiDou Navigation Satellite System (BDS), GLONASS satellite navigation system, Galileo satellite navigation system, etc.

For example, in some embodiments where the plurality of pieces of position data is position data based on the geodetic coordinate system, the plurality of pieces of position data may be directly determined as the coordinates of the plurality of first positions. In other embodiments where the plurality of pieces of position data is based on a particular coordinate system rather than the geodetic coordinate system, the plurality of pieces of position data needs to be converted from the particular coordinate system to the geodetic coordinate system to obtain the coordinates of the plurality of first positions.

For example, the plurality of first positions has different coordinates from one another and coordinates of each of the plurality of first positions are at a different angle relative to the target object from coordinates of another of the plurality of first positions. The present disclosure includes, but is not limited to, such an example. In other embodiments, at least part of the plurality of first positions may have identical coordinates, and/or the coordinates of at least part of the plurality of first positions may be at a same angle relative to the target object.

For example, coordinates of each first position in the coordinates of the plurality of first positions includes a longitude, a latitude, and an altitude. The coordinates of the first position represent a longitude, a latitude, and an altitude corresponding to the image capturing device when capturing the input image.

For example, the first three-dimensional reconstruction model represents a model in a reconstruction coordinate system. The reconstruction coordinate system may be a rectangular coordinate system.

For example, at step S11, the plurality of input images corresponds to the coordinates of the plurality of second positions in one-to-one correspondence.

For example, at step S11, said constructing the reconstruction coordinate system based on the plurality of input images includes: determining a reference input image in the plurality of input images; and establishing the reconstruction coordinate system using coordinates of a first position corresponding to the reference input image as a coordinate origin, a first reference direction as a first coordinate axis, a second reference direction as a second coordinate axis, and a view direction corresponding to the reference input image as a third coordinate axis.

For example, a number of input images among the plurality of input images which match the reference input image is maximal. That is, a quantity of input images matching the reference input image in the plurality of input images is greater than or equal to a quantity of input images matching any of the input images in the plurality of input images other than the reference input image. In some embodiments of the present disclosure, two input images matching each other may indicate a high degree of similarity between the two input images. For example, when a quantity of matching feature points (feature points represent points or blocks of scale invariance on the target object) between two input images is equal to or greater than a specific threshold (e.g., 16, etc.), the two input images match each other.

For example, the first reference direction may be a horizontal direction, the second reference direction may be a vertical direction, and the view direction corresponding to the reference input image may indicate a direction towards which the image capturing device was facing when capturing the reference input image.

For example, in some embodiments, at step S11, said performing the three-dimensional reconstruction processing for the target object based on the reconstruction coordinate system, to obtain the first three-dimensional reconstruction model of the target object and the coordinates of the plurality of second positions, in the reconstruction coordinate system, of the image capturing device corresponding to the plurality of input images includes: performing, on the plurality of input images, the three-dimensional reconstruction processing for the target object using a three-dimensional reconstruction algorithm to obtain the first three-dimensional reconstruction model; determining coordinates of a second position corresponding to the reference input image as an origin of the reconstruction coordinate system; and determining coordinates of second positions corresponding to remaining input images in the plurality of input images other than the reference input image based on position relationships between the remaining input images and the reference input image. In this manner, the coordinates of the plurality of second positions are obtained.

For example, in an embodiment, the coordinates of the plurality of second positions includes coordinates of a second position corresponding to the reference input image and coordinates of second positions corresponding to the remaining input images.

For example, in some other embodiments, at step S11, said performing the three-dimensional reconstruction processing for the target object based on the reconstruction coordinate system, to obtain the first three-dimensional reconstruction model of the target object and the coordinates of the plurality of second positions, in the reconstruction coordinate system, of the image capturing device corresponding to the plurality of input images includes: performing, on the plurality of input images, the three-dimensional reconstruction processing for the target object using a three-dimensional reconstruction algorithm to obtain an intermediate three-dimensional reconstruction model; normalizing the intermediate three-dimensional reconstruction model to obtain the first three-dimensional reconstruction model; determining coordinates of a second position corresponding to the reference input image as an origin of the reconstruction coordinate system; and determining coordinates of second positions corresponding to remaining input images in the plurality of input images other than the reference input image based on position relationships between the remaining input images and the reference input image. In this manner, the coordinates of the plurality of second positions are obtained.

For example, in an embodiment, the first three-dimensional reconstruction model is located within a normalized cube region in the reconstruction coordinate system. The normalized cube region ranges from −1 to 1 on each of the first coordinate axis, the second coordinate axis, and the third coordinate axis of the reconstruction coordinate system. The coordinates of the plurality of second positions includes the coordinates of the second position corresponding to the reference input image and the coordinates of the second positions corresponding to the remaining input images. For example, a normalization processing can facilitate a subsequent processing on the normalized first three-dimensional reconstruction model, simplify calculations, and eliminate undesirable effects caused by outlier sample data.

For example, in an embodiment of the present disclosure, the coordinates of second position corresponding to the reference input image are used as a coordinate origin of the reconstruction coordinate system. That is, the coordinates of the second position corresponding to the reference input image are $(0,0,0)$.

For example, the three-dimensional model of an object may be reconstructed by various suitable three-dimensional reconstruction algorithms. The three-dimensional reconstruction algorithm may include suitable algorithms such as the vision-based SFM algorithm. The SFM algorithm is an offline algorithm for three-dimensional reconstruction based on various collected unordered images. The SFM algorithm mainly includes steps of: extracting feature points of images; matching the feature points of the images; performing paired matching on the images; selecting an image having a highest number of matching pairs as a seed image (e.g., the seed image may be the reference input image mentioned above), adding new images one by one to calculate relative positions between the cameras corresponding to individual images, and expand a three-dimensional point cloud; performing a reprojection error minimization processing (e.g., bundle adjustment) for all images to optimize results of positions of the cameras corresponding to the individual images. When correctly matching pairs of points are connected to each other, a preliminary movement trajectory of the feature points is formed. Then, the whole trajectory is drawn to obtain a sparse three-dimensional point cloud. For the detailed steps of the SFM algorithm, reference can be made to the description of the SFM algorithm in the related art, which will not be elaborated here.

For example, in some embodiments, step S12 includes: calculating a transformation matrix between the reconstruction coordinate system and the geodetic coordinate system based on the coordinates of the plurality of first positions and the coordinates of the plurality of second positions; and performing the transformation processing on the at least part of points in the first three-dimensional reconstruction model using the transformation matrix to obtain the second three-dimensional reconstruction model.

For example, in an embodiment, the operation of calculating the transformation matrix between the reconstruction coordinate system and the geodetic coordinate system based on the coordinates of the plurality of first positions and the coordinates of the plurality of second positions includes: transforming the coordinates of the plurality of first positions from the geodetic coordinate system to an intermediate coordinate system to obtain coordinates of a plurality of third positions, in the intermediate coordinate system, of the image capturing device corresponding to the plurality of input images, the coordinates of the plurality of third positions corresponding to the coordinates of the plurality of first positions in one-to-one correspondence, and the transforming from the geodetic coordinate system to the intermediate coordinate system being based on a first transformation sub-matrix; calculating a second transformation sub-matrix between the intermediate coordinate system and the reconstruction coordinate system based on the coordinates of the plurality of second positions and the coordinates of the plurality of third positions; and calculating the transformation matrix based on the first transformation sub-matrix and the second transformation sub-matrix.

For example, in an embodiment, the transformation matrix refers to a transformation matrix for a transformation from the reconstruction coordinate system to the geodetic coordinate system, and the second three-dimensional reconstruction model may refer to a model in the geodetic coordinate system.

For example, in an embodiment, the transformation matrix may be a product of a transformation sub-matrix for transforming from the reconstruction coordinate system to the intermediate coordinate system and a transformation sub-matrix for transforming from the intermediate coordinate system to the geodetic coordinate system.

For example, in some other embodiments, step S12 includes: transforming the coordinates of the plurality of first positions from the geodetic coordinate system to an intermediate coordinate system to obtain coordinates of a plurality of third positions, in the intermediate coordinate system, of the image capturing device corresponding to the plurality of input images, the coordinates of the plurality of third positions corresponding to the coordinates of the plurality of first positions in one-to-one correspondence, and the transforming from the geodetic coordinate system to the intermediate coordinate system being based on a first transformation sub-matrix; calculating a second transformation sub-matrix between the intermediate coordinate system and the reconstruction coordinate system based on the coordinates of the plurality of second positions and the coordinates of the plurality of third positions, as the transformation matrix; and performing the transformation processing on the at least part of points in the first three-dimensional reconstruction model using the transformation matrix to obtain the second three-dimensional reconstruction model.

For example, in an embodiment, the transformation matrix refers to the second transformation sub-matrix for transforming from the reconstruction coordinate system to the intermediate coordinate system, in which case the second three-dimensional reconstruction model may refer to a model in the intermediate coordinate system.

For example, in some embodiments, as illustrated in FIG. 3, the intermediate coordinate system may be a local Cartesian coordinates coordinate system O'ENU (i.e., the East-North-Up (ENU) coordinate system). The local Cartesian coordinates coordinate system O'ENU is a rectangular coordinate system. An origin O' of the local Cartesian coordinates coordinate system O'ENU is a position indicated by average values of the coordinates of the plurality of first positions. A Z-axis (i.e., U-axis) of the local Cartesian coordinates coordinate system O'ENU coincides with a normal line of the reference ellipsoid (directed to the zenith). A Y-axis (i.e., N-axis) of the local Cartesian coordinates coordinate system O'ENU coincides with a semi-minor axis of the reference ellipsoid (directed to the north). An X-axis (i.e., E-axis) of the local Cartesian coordinates coordinate system O'ENU coincides with a semi-major axis of the reference ellipsoid (directed to the east). The local Cartesian coordinates coordinate system O'ENU has features such as convenient alignment with the map and easy calculation.

It should be noted that in the embodiments of the present disclosure, the intermediate coordinate system is not limited to the local Cartesian coordinates coordinate system. Alternatively, the intermediate coordinate system may be other suitable coordinate systems, which can be determined by the user according to actual situations.

For example, the intermediate coordinate system may be a rectangular coordinate system.

For example, since the coordinates of the first position represent GPS coordinates (i.e., longitude, latitude, and altitude) and respective units and measures of the longitude, latitude, and altitude are inconsistent, it is necessary to transform the coordinates of the first position to the intermediate coordinate system having a consistent measure for respective axes. Transforming the coordinates of the first position to the intermediate coordinate system can simplify calculation, and facilitate a quick and easy transformation of coordinates of new input images to the intermediate coordinate system when the new input images are added subsequently.

It should be noted that, for the first transformation sub-matrix, reference may be made to relevant contents for transformations of different coordinate systems (e.g., the geodetic coordinate system and the local Cartesian coordinates coordinate system (when the intermediate coordinate system is the local Cartesian coordinates coordinate system)) in the related art, which will not be elaborated here.

For example, the second transformation sub-matrix is expressed as:

$$M = \begin{bmatrix} s*r11 & s*r12 & s*r13 & tx \\ s*r21 & s*r22 & s*r23 & ty \\ s*r31 & s*r32 & s*r33 & tz \\ 0 & 0 & 0 & 1 \end{bmatrix},$$

where M represents the second transformation sub-matrix, s represents a scaling factor, r11, r12, r13, r21, r22, r23, r31, r32, and r33 represent rotation parameters, and tx, ty, and tz represent translation parameters.

For example, the coordinates of the plurality of second positions, the coordinates of the plurality of third positions, and the second transformation sub-matrix satisfy a relationship of:

$$Pi=M*Qi,$$

where Pi represents a matrix corresponding to coordinates of an i-th third position in the coordinates of the plurality of third positions, and Qi represents a matrix corresponding to coordinates of an i-th second position in the coordinates of the plurality of second positions.

Qi is expressed as:

$$Qi = \begin{bmatrix} x1i \\ y1i \\ z1i \\ 1 \end{bmatrix},$$

where x1i, y1i, and z1i represent the coordinates of the i-th second position.

Pi is expressed as:

$$Pi = \begin{bmatrix} x2i \\ y2i \\ z2i \\ 1 \end{bmatrix},$$

where x2i, y2i, and z2i represent the coordinates of the i-th third position.

For example, in some embodiments, the three-dimensional reconstruction method further includes: determining an actual scale of at least part of the target object based on the second three-dimensional reconstruction model.

For example, dimensions of at least part of the second three-dimensional reconstruction model are the same as dimensions of a part of the target object corresponding to the at least part of the second three-dimensional reconstruction model. Therefore, the dimensions of the part of the target object corresponding to the at least part of the second three-dimensional reconstruction model, i.e., the actual dimensions of the target object, may be obtained based on the dimensions of the at least part of the second three-dimensional reconstruction model.

For example, in some embodiments, the transformation processing is performed on all points in the first three-dimensional reconstruction model to obtain the second three-dimensional reconstruction model, in which case dimensions of the second three-dimensional reconstruction model are the same as the actual dimensions of the target object.

For example, the first three-dimensional reconstruction model is a three-dimensional point cloud model. The second three-dimensional reconstruction model may also be a three-dimensional point cloud model.

Figure 4:
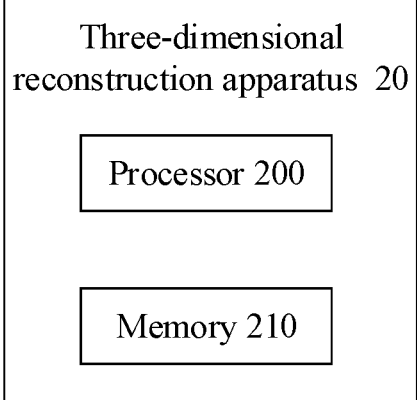
FIG. 4 is a schematic block diagram of a three-dimensional reconstruction apparatus according to at least one embodiment of the present disclosure.

According to least one embodiment of the present disclosure, a three-dimensional reconstruction apparatus is further provided. FIG. 4 is a schematic block diagram of a three-dimensional reconstruction apparatus according to at least one embodiment of the present disclosure.

For example, as illustrated in FIG. 4, the three-dimensional reconstruction apparatus 20 includes a processor 200 and a memory 210. It should be noted that components of the three-dimensional reconstruction apparatus 20 illustrated in FIG. 4 are exemplary rather than restrictive. The three-dimensional reconstruction apparatus 20 may also include other components as desired by actual applications.

For example, the processor 200 and the memory 210 may be in direct or indirect communication with each other.

For example, the processor 200 and the memory 210 may be in communication with each other via a network connection. The network may include a wireless network, a wired network, and/or any combination of the wireless network and the wired network. The intercommunication between the processor 200 and the memory 210 may be realized via a system bus, which is not limited in the present disclosure.

For example, the memory 210 is configured to store computer-readable instructions in a non-transitory way. When the processor 200 is used to execute the computer-readable instructions, the computer-readable instructions, when executed by the processor 200, implement the video processing method according to any of the above embodiments. Specific implementations of various steps of the video processing method and related explanatory contents can be found in the embodiments of the video processing method described above, which will not be elaborated here.

For example, the processor 200 and the memory 210 may be set up on a server side (or the cloud).

For example, the processor 200 may control other components in the three-dimensional reconstruction apparatus 20 to perform a desired function. The processor 200 may be a Central Processing Unit (CPU), a Network Processor (NP), etc.; or a Digital Signal Processor (DSP), an Application Specific Integrated Circuit (ASIC), a Field Programmable Gate Array (FPGA) or other programmable logic devices, a discrete gate or a transistor logic device, or a discrete hardware component. For example, the CPU may be in an X86 or ARM architecture.

For example, the memory 210 may include any combination of one or more computer program products. The computer program products may include various forms of computer-readable storage media, such as a volatile memory and/or a non-volatile memory. The volatile memory may include, for example, a Random Access Memory (RAM) and/or a cache memory, etc. The non-volatile memory may include, for example, a Read-Only Memory (ROM), a hard disk, an Erasable Programmable ROM (EPROM), a portable Compact Disk-ROM (CD-ROM), a Universal Serial Bus (USB) memory, a flash memory, etc. One or more computer-readable instructions may be stored on the computer-readable storage medium. The processor 200 may execute the one or more computer-readable instructions to implement various functions of the electronic device. Various applications, various data, or the like may also be stored in the storage medium.

For example, in some embodiments, the three-dimensional reconstruction apparatus 20 further includes the image capturing device. The image capturing device is configured to capture the plurality of input images including the target object.

For example, the image capturing device may include a device capable of capturing videos and/or images, e.g., a camera and a camcorder. The image capturing device may be set up integrally with the three-dimensional reconstruction apparatus 20, or separately from the three-dimensional reconstruction apparatus 20 but in a communication connection with the three-dimensional reconstruction apparatus 20 in a wireless manner (e.g., Bluetooth, etc.) or a wired manner, etc.

For example, the three-dimensional reconstruction apparatus 20 further includes a pose collecting device. The pose collecting device may include a satellite positioning system. The pose collecting device is configured to collect, via the satellite positioning system, the coordinates of the first positions of the image capturing device in the geodetic coordinate system.

For example, the pose collecting device includes a gyroscope, an accelerometer, or a satellite positioning device, etc. For example, the pose collecting device may also implement, via SLAM technology, a function of collecting the coordinates of the first positions.

For example, the pose collecting device may be set up integrally with the three-dimensional reconstruction apparatus 20, or separately from the three-dimensional reconstruction apparatus 20 but in a communication connection with the three-dimensional reconstruction apparatus 20 in a wireless manner (e.g., Bluetooth, etc.) or a wired manner, etc.

For example, the three-dimensional reconstruction apparatus 20 further includes a positioning device. The positioning device may include a GPS module, a BeiDou module, etc. The positioning device is configured to locate the image capturing device.

It should be noted that the positioning device, the pose collecting device, and the image capturing device need to be set up integrally to facilitate locating the position of the image capturing device by the positioning device and collecting the position data of the image capturing device by the pose collecting device.

For example, in some embodiments, the three-dimensional reconstruction apparatus 20 may be applied to a display device. The display device may be a mobile terminal, e.g., a cell phone, a tablet computer, etc. The processor 200, the memory 210, the positioning device, the pose collecting device, and the image capturing device in the three-dimensional reconstruction apparatus 20 are disposed on the mobile terminal. For example, the pose collecting device may be a gyroscope disposed inside the mobile terminal, and the image capturing device may be a camera (including an under-screen camera, etc.) on the mobile device. The present disclosure is not limited here. The image capturing device may alternatively be disposed outside the mobile terminal. For example, the image capturing device may collect a video remotely and transmit, via a network, the video to the mobile terminal for subsequent processing by the mobile terminal.

For example, the display device may include a display panel. The display panel is configured to display the first three-dimensional reconstruction model and the second three-dimensional reconstruction model and may further be configured to display virtual AR special effects, etc.

For example, the display panel may be a rectangular panel, a circular panel, an oval panel, or a polygonal panel, etc. In addition, the display panel may be a flat panel, a curved panel, or even a spherical panel.

For example, the display device may have a touch function. That is, the display device may be a touch display device.

For example, for a detailed description of the processes of performing the three-dimensional reconstruction method by the three-dimensional reconstruction apparatus reference may be made to the relevant description in the embodiments of the three-dimensional reconstruction method, and thus the same features will not be elaborated here.

Figure 5:
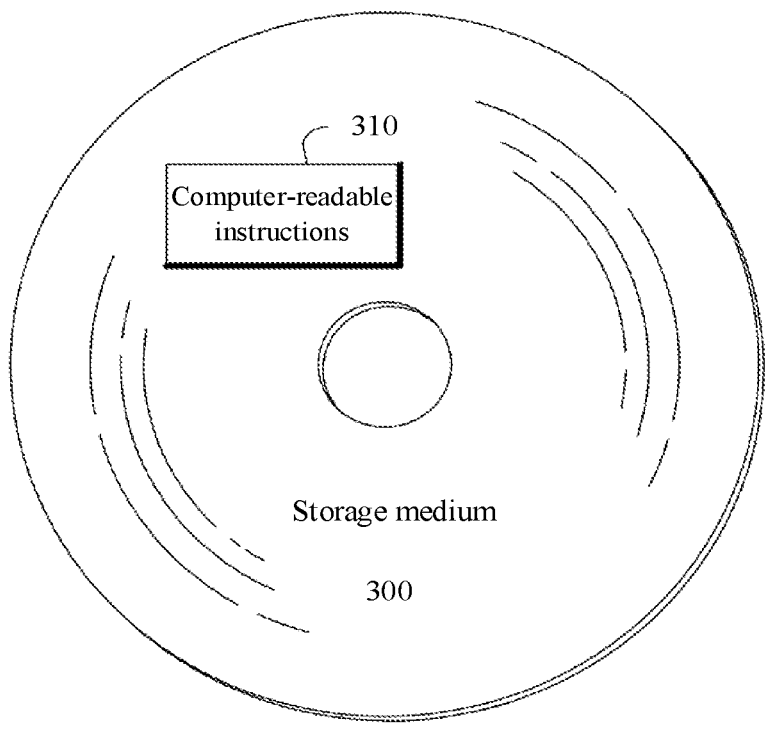
FIG. 5 is a schematic diagram of a non-transitory computer-readable storage medium according to at least one embodiment of the present disclosure.

FIG. 5 is a schematic diagram of a non-transitory computer-readable storage medium according to at least one embodiment of the present disclosure. For example, as illustrated in FIG. 5, one or more computer-readable instructions 310 may be non-transitorily stored on a storage medium 300. For example, the one or more computer-readable instructions 310, when executed by a processor, may perform one or more steps of the three-dimensional reconstruction method described above.

For example, the storage medium 300 may be applied in the three-dimensional reconstruction apparatus 20. For example, the storage medium 300 may include the memory 210 in the three-dimensional reconstruction apparatus 20.

For example, for the description of the storage medium 300, reference may be made to the description of the memory 210 in the embodiments of the three-dimensional reconstruction apparatus 20, and thus the same features will not be elaborated here.

Figure 6:
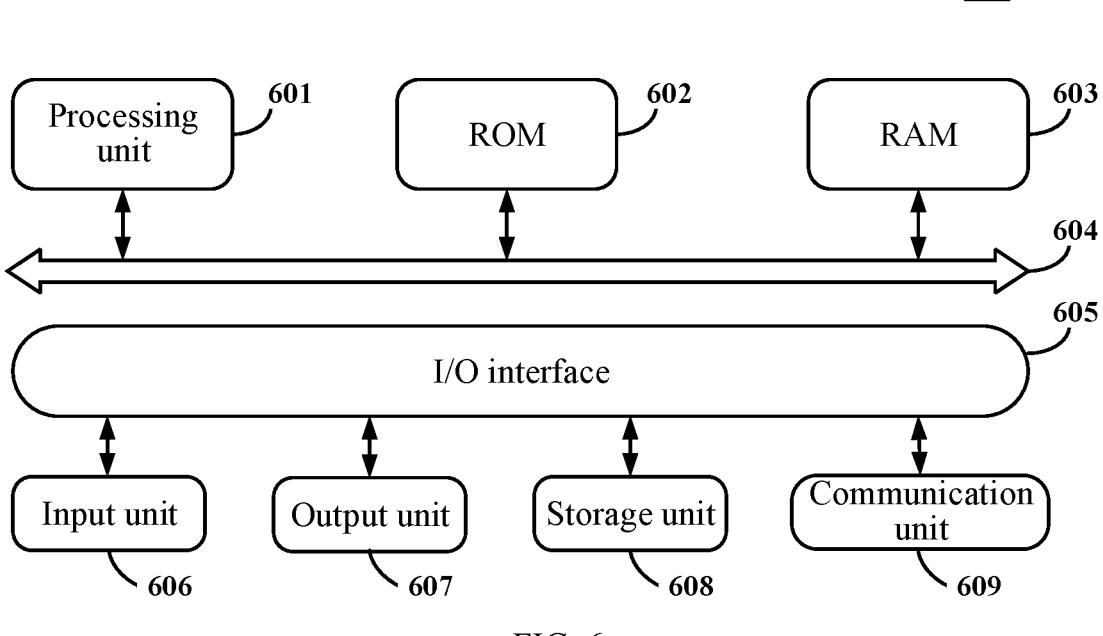
FIG. 6 is a schematic structural diagram of an electronic device according to at least one embodiment of the present disclosure.

FIG. 6 is a schematic diagram showing a structure adapted to implement an electronic device (e.g., the electronic device may include the display device described in the above embodiments) 600 according to the embodiments of the present disclosure. The electronic device according to the embodiment of the present disclosure may include, but is not limited to, mobile terminals such as a mobile phone, a laptop computer, a digital broadcast receiver, a PDA, a tablet computer or PAD, a Portable Multimedia Player (PMP), and a vehicle-mounted terminal (e.g., a vehicle-mounted navigation terminal), and fixed terminals such as a digital TV, a desktop computer, etc. The electronic device illustrated in FIG. 6 is exemplary only, and should not be construed as limiting the function and scope of use of the embodiments of the present disclosure.

As illustrated in FIG. 6, the electronic device 600 may include a processing unit (such as a central processing unit, a graphics processing unit, etc.) 601, which may perform various appropriate actions and processings in accordance with programs stored in an ROM 602 or loaded from a storage unit 608 into an RAM 603. Various programs and data required for operation of the electronic device 600 may also be stored in the RAM 603. The processing unit 601, the ROM 602, and the RAM 603 are connected to each other through a bus 604. An Input/Output (I/O) interface 605 is also connected to the bus 604.

Generally, the following devices may be connected to the I/O interface 605: an input unit 606 including, for example, a touch screen, a touch panel, a keyboard, a mouse, a camera, a microphone, an accelerometer, a gyroscope, etc.; an output unit 607 including, for example, a Liquid Crystal Display (LCD), a speaker, an oscillator, etc.; the storage unit 608 including, for example, a magnetic tape, a hard disk, etc.; and a communication unit 609. The communication unit 609 may allow the electronic device 600 to perform wireless or wired communication with other devices for data exchange. Although FIG. 6 illustrates the electronic device 600 having various units, it can be appreciated that it is not necessary to implement or provide all the illustrated units. Alternatively, more or fewer units may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a non-transitory computer-readable medium. The computer program includes program codes for implementing the method illustrated in any of the flowcharts. In these embodiments, the computer program may be downloaded and installed from a network through the communication unit 609, or installed from the storage unit 608, or installed from the ROM 602. When the computer program is executed by the processing unit 601, the above-mentioned functions defined in the methods according to the embodiments of the present disclosure are performed.

It should be noted that in the context of the present disclosure, the computer-readable medium may be a tangible medium that may contain or store a program for use by or in conjunction with an instruction execution system, device or apparatus. The computer-readable medium may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but is not limited to: an electrical connection having one or more wires, a portable computer disk, a hard disk, an RAM, an ROM, an EPROM or a flash memory, an optical fiber, a CD-ROM, an optical storage device, a magnetic storage device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, and may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

In some embodiments, the client and the server may communicate using any currently-known or future-developed network protocol, such as HTTP (HyperText Transfer Protocol), and may be in interconnection with digital data communication in any form or medium (e.g., a communication network). Examples of communication networks include a Local Area Network ("LAN"), a Wide Area Network ("WAN"), the Internet work (e.g., the Internet), and an end-to-end network (e.g., ad hoc end-to-end network), as well as any currently-known or future-developed network.

The above computer-readable medium may be included in the above electronic device; or may be standalone without being assembled into the electronic device.

The computer program codes for implementing the operations of the present disclosure may be written in one or more programming languages or any combination thereof. The programming languages may include, but are not limited to, object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any type of network, including a Local Area Network (LAN) or a Wide Area Network (WAN), or to an external computer (e.g., over the Internet by using an Internet service provider).

The flowcharts and block diagrams in the figures illustrate architectures, functions, and operations of possible implementations of systems, methods and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It is also to be noted that, in some alternative implementations, functions showed in blocks may occur in a different order from the order shown in the figures. For example, two blocks illustrated in succession may actually be executed substantially in parallel with each other, or sometimes even in a reverse order, depending on functions involved. It is also to be noted that each block in the block diagrams and/or flowcharts, or any combination of the blocks in the block diagrams and/or flowcharts, may be implemented using a dedicated hardware-based system that is configured to perform specified functions or operations, or using a combination of dedicated hardware and computer instructions.

Units involved and described in the embodiments of the present disclosure can be implemented in software or hardware. Here, a name of a unit does not constitute a limitation on the unit itself under certain circumstances.

The functions described above may be performed, at least in part, by one or more hardware logic components. For example, without limitation, exemplary types of suitable hardware logic components include an FPGA, an ASIC, an Application Specific Standard Product (ASSP), a System on Chip (SOC), a Complex Programmable Logic Device (CPLD), and the like.

According to one or more embodiments of the present disclosure, a three-dimensional reconstruction method is provided. The three-dimensional reconstruction method includes: obtaining a plurality of input images each including a target object, and obtaining coordinates of a plurality of first positions, in a geodetic coordinate system, of an image capturing device corresponding to the plurality of input images; constructing a reconstruction coordinate system based on the plurality of input images, and performing a three-dimensional reconstruction processing for the target object based on the reconstruction coordinate system, to obtain a first three-dimensional reconstruction model of the target object and coordinates of a plurality of second positions, in the reconstruction coordinate system, of the image capturing device corresponding to the plurality of input images; and performing a transformation processing on at least part of points in the first three-dimensional reconstruction model based on the coordinates of the plurality of first positions and the coordinates of the plurality of second positions to obtain a second three-dimensional reconstruction model.

According to one or more embodiments of the present disclosure, said performing the transformation processing on the at least part of points in the first three-dimensional reconstruction model based on the coordinates of the plurality of first positions and the coordinates of the plurality of second positions to obtain the second three-dimensional reconstruction model includes: calculating a transformation matrix between the reconstruction coordinate system and the geodetic coordinate system based on the coordinates of the plurality of first positions and the coordinates of the plurality of second positions; and performing the transformation processing on the at least part of points in the first three-dimensional reconstruction model using the transformation matrix to obtain the second three-dimensional reconstruction model.

According to one or more embodiments of the present disclosure, said calculating the transformation matrix between the reconstruction coordinate system and the geodetic coordinate system based on the coordinates of the plurality of first positions and the coordinates of the plurality of second positions includes: transforming the coordinates of the plurality of first positions from the geodetic coordinate system to an intermediate coordinate system to obtain coordinates of a plurality of third positions, in the intermediate coordinate system, of the image capturing device corresponding to the plurality of input images, the coordinates of the plurality of third positions corresponding to the coordinates of the plurality of first positions in one-to-one correspondence, and the transforming from the geodetic coordinate system to the intermediate coordinate system being based on a first transformation sub-matrix; calculating a second transformation sub-matrix between the intermediate coordinate system and the reconstruction coordinate system based on the coordinates of the plurality of second positions and the coordinates of the plurality of third positions; and calculating the transformation matrix based on the first transformation sub-matrix and the second transformation sub-matrix.

According to one or more embodiments of the present disclosure, said performing the transformation processing on the at least part of points in the first three-dimensional reconstruction model based on the coordinates of the plurality of first positions and the coordinates of the plurality of second positions to obtain the second three-dimensional reconstruction model includes: transforming the coordinates of the plurality of first positions from the geodetic coordinate system to an intermediate coordinate system to obtain coordinates of a plurality of third positions, in the intermediate coordinate system, of the image capturing device corresponding to the plurality of input images, the coordinates of the plurality of third positions corresponding to the coordinates of the plurality of first positions in one-to-one correspondence, and the transforming from the geodetic coordinate system to the intermediate coordinate system being based on a first transformation sub-matrix; calculating a second transformation sub-matrix between the intermediate coordinate system and the reconstruction coordinate system based on the coordinates of the plurality of second positions and the coordinates of the plurality of third positions, as the transformation matrix; and performing the transformation processing on the at least part of points in the first three-dimensional reconstruction model using the transformation matrix to obtain the second three-dimensional reconstruction model.

According to one or more embodiments of the present disclosure, the second transformation sub-matrix is expressed as:

$$M = \begin{bmatrix} s*r11 & s*r12 & s*r13 & tx \\ s*r21 & s*r22 & s*r23 & ty \\ s*r31 & s*r32 & s*r33 & tz \\ 0 & 0 & 0 & 1 \end{bmatrix},$$

where M represents the second transformation sub-matrix, s represents a scaling factor, r11, r12, r13, r21, r22, r23, r31, r32, and r33 represent rotation parameters, and tx, ty, and tz represent translation parameters; and the coordinates of the plurality of second positions, the coordinates of the plurality of third positions, and the second transformation sub-matrix satisfy a relationship of:

$$Pi = M * Qi,$$

where Pi represents a matrix corresponding to coordinates of an i-th third position in the coordinates of the plurality of third positions, and Qi represents a matrix corresponding to coordinates of an i-th second position in the coordinates of the plurality of second positions.

Qi is expressed as:

$$Qi = \begin{bmatrix} x1i \\ y1i \\ z1i \\ 1 \end{bmatrix},$$

where x1i, y1i, and z1i represent the coordinates of the i-th second position.

Pi is expressed as:

$$Pi = \begin{bmatrix} x2i \\ y2i \\ z2i \\ 1 \end{bmatrix},$$

where x2i, y2i, and z2i represent the coordinates of the i-th third position.

According to one or more embodiments of the present disclosure, the intermediate coordinate system is a local Cartesian coordinates coordinate system, an origin of the local Cartesian coordinates coordinate system being average values of the coordinates of the plurality of first positions.

According to one or more embodiments of the present disclosure, said obtaining the coordinates of the plurality of first positions, in the geodetic coordinate system, of the image capturing device corresponding to the plurality of input images includes: reading a plurality of pieces of position data, which are recorded by the image capturing device at respective times when capturing the plurality of input images, and obtaining the coordinates of the plurality of first positions based on the plurality of pieces of position data.

According to one or more embodiments of the present disclosure, the plurality of pieces of position data is determined by a satellite positioning system.

According to one or more embodiments of the present disclosure, said constructing the reconstruction coordinate system based on the plurality of input images includes: determining a reference input image in the plurality of input images, a number of input images among the plurality of input images which match the reference input image being maximal; and establishing the reconstruction coordinate system using coordinates of a first position corresponding to the reference input image as a coordinate origin, a first reference direction as a first coordinate axis, a second reference direction as a second coordinate axis, and a view direction corresponding to the reference input image as a third coordinate axis.

According to one or more embodiments of the present disclosure, said performing the three-dimensional reconstruction processing for the target object based on the reconstruction coordinate system, to obtain the first three-dimensional reconstruction model of the target object and the coordinates of the plurality of second positions, in the reconstruction coordinate system, of the image capturing device corresponding to the plurality of input images includes: performing, on the plurality of input images, the three-dimensional reconstruction processing for the target object using a three-dimensional reconstruction algorithm to obtain the first three-dimensional reconstruction model; determining coordinates of a second position corresponding to the reference input image as an origin of the reconstruction coordinate system; and determining coordinates of second positions corresponding to remaining input images in the plurality of input images other than the reference input image based on position relationships between the remaining input images and the reference input image. The coordinates of the plurality of second positions include the coordinates of the second position corresponding to the reference input image and the coordinates of the second positions corresponding to the remaining input images.

According to one or more embodiments of the present disclosure, said performing the three-dimensional reconstruction processing for the target object based on the reconstruction coordinate system, to obtain the first three-dimensional reconstruction model of the target object and the coordinates of the plurality of second positions, in the reconstruction coordinate system, of the image capturing device corresponding to the plurality of input images includes: performing, on the plurality of input images, the three-dimensional reconstruction processing for the target object using a three-dimensional reconstruction algorithm to obtain an intermediate three-dimensional reconstruction model; normalizing the intermediate three-dimensional reconstruction model to obtain the first three-dimensional reconstruction model; determining coordinates of a second position corresponding to the reference input image as an origin of the reconstruction coordinate system; and determining coordinates of second positions corresponding to remaining input images in the plurality of input images other than the reference input image based on position relationships between the remaining input images and the reference input image. The first three-dimensional reconstruction model is located within a normalized cube region in the reconstruction coordinate system. The normalized cube region ranges from −1 to 1 on each of the first coordinate axis, the second coordinate axis, and the third coordinate axis of the reconstruction coordinate system. The coordinates of the plurality of second positions includes the coordinates of the second position corresponding to the reference input image and the coordinates of the second positions corresponding to the remaining input images.

According to one or more embodiments of the present disclosure, the first reference direction is a horizontal direction, and the second reference direction is a vertical direction.

According to one or more embodiments of the present disclosure, the three-dimensional reconstruction method further includes: determining an actual scale of at least part of the target object based on the second three-dimensional reconstruction model.

According to one or more embodiments of the present disclosure, the first three-dimensional reconstruction model is a three-dimensional point cloud model.

According to one or more embodiments of the present disclosure, the plurality of first positions has different coordinates from each other, and coordinates of each of the plurality of first positions are at a different angle relative to the target object from coordinates of another of the plurality of first positions. The coordinates of each of the plurality of first positions includes a longitude, a latitude, and an altitude.

According to one or more embodiments of the present disclosure, the target object includes a landmark building.

According to one or more embodiments of the present disclosure, a three-dimensional reconstruction apparatus is provided. The three-dimensional reconstruction apparatus includes: a memory configured to store computer-readable instructions in a non-transitory manner; and a processor configured to execute the computer-readable instructions. The computer-readable instructions, when executed by the processor, implement the three-dimensional reconstruction method according to any of the embodiments of the present disclosure.

According to one or more embodiments of the present disclosure, a non-transitory computer-readable storage medium is provided. The non-transitory computer-readable storage medium has computer-readable instructions stored thereon. The computer-readable instructions, when executed by a processor, implement the three-dimensional reconstruction method according to any of the embodiments of the present disclosure.

The above description is only intended to explain the preferred embodiments of the present disclosure and the employed principles of technology. It will be appreciated by those skilled in the art that the scope of the present disclosure is not limited to the technical solutions formed by the specific combinations of the above technical features, but should also encompass other technical solutions formed by any combinations of features described above or equivalents thereof without departing from the above concepts of the present disclosure, for example, technical solutions formed by replacing the above features with the technical features disclosed (but not limited to them) in the present disclosure having similar functions.

Further, although the operations are depicted in a specific order, this should not be understood as requiring these operations to be performed in the specific order illustrated or in a sequential order. Under certain circumstances, multi-tasking and parallel processing may be advantageous. Likewise, although several specific implementation details are included in the above discussion, these should not be construed as limitations on the scope of the present disclosure. Certain features that are described in the context of separate embodiments can also be implemented in combination in a single embodiment. Conversely, various features described in the context of a single embodiment can also be implemented in multiple embodiments separately or in any suitable sub-combination.

Although the subject matter has been described in a language specific to structural features and/or logical actions of method, it should be understood that the subject matter defined in the appended claims is not necessarily limited to the specific features or actions described above. On the contrary, the specific features and actions described above are merely exemplary forms of implementing the claims.

For the present disclosure, it is desirable to take into consideration the following points.

(1) The accompanying drawings of the embodiments of the present disclosure relate only to structures related to the embodiments of the present disclosure. Conventional designs may be referred to for other structures.

(2) For the sake of clarity, in the accompanying drawings used to describe the embodiments of the present disclosure, thicknesses and dimensions of layers or structures are enlarged. It should be understood that when an element such as a layer, a film, a region, or a substrate is described as being located "above" or "below" another element, that element may be "directly" located "above" or "below" the other element, or an intermediate element may exist.

(3) The embodiments and features in the embodiments of the present disclosure may be combined with each other to obtain new embodiments without conflicts.

While the specific embodiments of the present disclosure have been described above, the protect scope of the present disclosure is not limited to these embodiments. The protect scope of the present disclosure is defined by the claims.

What is claimed is:

1. A three-dimensional reconstruction method, comprising:

obtaining a plurality of input images each comprising a target object, and obtaining coordinates of a plurality of first positions, in a geodetic coordinate system, of an image capturing device corresponding to the plurality of input images;

constructing a reconstruction coordinate system based on the plurality of input images, and performing a three-dimensional reconstruction processing for the target object based on the reconstruction coordinate system, to obtain a first three-dimensional reconstruction model of the target object and coordinates of a plurality of second positions, in the reconstruction coordinate system, of the image capturing device corresponding to the plurality of input images; and performing a transformation processing on at least part of points in the first three-dimensional reconstruction model based on the coordinates of the plurality of first positions and the coordinates of the plurality of second positions to obtain a second three-dimensional reconstruction model.

2. The three-dimensional reconstruction method according to claim 1, wherein said performing the transformation processing on the at least part of points in the first three-dimensional reconstruction model based on the coordinates of the plurality of first positions and the coordinates of the plurality of second positions to obtain the second three-dimensional reconstruction model comprises:

calculating a transformation matrix between the reconstruction coordinate system and the geodetic coordinate system based on the coordinates of the plurality of first positions and the coordinates of the plurality of second positions; and performing the transformation processing on the at least part of points in the first three-dimensional reconstruction model using the transformation matrix to obtain the second three-dimensional reconstruction model.

3. The three-dimensional reconstruction method according to claim 2, wherein said calculating the transformation matrix between the reconstruction coordinate system and the geodetic coordinate system based on the coordinates of the plurality of first positions and the coordinates of the plurality of second positions comprises:

transforming the coordinates of the plurality of first positions from the geodetic coordinate system to an intermediate coordinate system to obtain coordinates of a plurality of third positions, in the intermediate coordinate system, of the image capturing device corresponding to the plurality of input images, the coordinates of the plurality of third positions corresponding to the coordinates of the plurality of first positions in one-to-one correspondence, and said transforming from the geodetic coordinate system to the intermediate coordinate system being based on a first transformation sub-matrix;

calculating a second transformation sub-matrix between the intermediate coordinate system and the reconstruction coordinate system based on the coordinates of the plurality of second positions and the coordinates of the plurality of third positions; and calculating the transformation matrix based on the first transformation sub-matrix and the second transformation sub-matrix.

4. The three-dimensional reconstruction method according to claim 3, wherein:

the second transformation sub-matrix is expressed as:

$$M = \begin{bmatrix} s*r11 & s*r12 & s*r13 & tx \\ s*r21 & s*r22 & s*r23 & ty \\ s*r31 & s*r32 & s*r33 & tz \\ 0 & 0 & 0 & 1 \end{bmatrix},$$

where M represents the second transformation sub-matrix, s represents a scaling factor, r11, r12, r13, r21, r22, r23, r31, r32, and r33 represent rotation parameters, and tx, ty, and tz represent translation parameters; and the coordinates of the plurality of second positions, the coordinates of the plurality of third positions, and the second transformation sub-matrix satisfy a relationship of:

$$Pi=M*Qi,$$

where Pi represents a matrix corresponding to coordinates of an i-th third position in the coordinates of the plurality of third positions, and Qi represents a matrix corresponding to coordinates of an i-th second position in the coordinates of the plurality of second positions, wherein Qi is expressed as:

$$Qi = \begin{bmatrix} x1i \\ y1i \\ z1i \\ 1 \end{bmatrix},$$

where x1i, y1i, and z1i represent the coordinates of the i-th second position, and Pi is expressed as:

$$Pi = \begin{bmatrix} x2i \\ y2i \\ z2i \\ 1 \end{bmatrix},$$

where x2i, y2i, and z2i represent the coordinates of the i-th third position.

5. The three-dimensional reconstruction method according to claim 3, wherein the intermediate coordinate system is a local Cartesian coordinates coordinate system, an origin of the local Cartesian coordinates coordinate system being average values of the coordinates of the plurality of first positions.

6. The three-dimensional reconstruction method according to claim 1, wherein said performing the transformation processing on the at least part of points in the first three-dimensional reconstruction model based on the coordinates of the plurality of first positions and the coordinates of the plurality of second positions to obtain the second three-dimensional reconstruction model comprises:

transforming the coordinates of the plurality of first positions from the geodetic coordinate system to an intermediate coordinate system to obtain coordinates of a plurality of third positions, in the intermediate coordinate system, of the image capturing device corresponding to the plurality of input images, the coordinates of the plurality of third positions corresponding to the coordinates of the plurality of first positions in one-to-one correspondence, and said transforming from the geodetic coordinate system to the intermediate coordinate system being based on a first transformation sub-matrix;

calculating a second transformation sub-matrix between the intermediate coordinate system and the reconstruction coordinate system based on the coordinates of the plurality of second positions and the coordinates of the plurality of third positions, as the transformation matrix; and performing the transformation processing on the at least part of points in the first three-dimensional reconstruction model using the transformation matrix to obtain the second three-dimensional reconstruction model.

7. The three-dimensional reconstruction method according to claim 6, wherein:

the second transformation sub-matrix is expressed as:

$$M = \begin{bmatrix} s*r11 & s*r12 & s*r13 & tx \\ s*r21 & s*r22 & s*r23 & ty \\ s*r31 & s*r32 & s*r33 & tz \\ 0 & 0 & 0 & 1 \end{bmatrix},$$

where M represents the second transformation sub-matrix, s represents a scaling factor, r11, r12, r13, r21, r22, r23, r31, r32, and r33 represent rotation parameters, and tx, ty, and tz represent translation parameters; and the coordinates of the plurality of second positions, the coordinates of the plurality of third positions, and the second transformation sub-matrix satisfy a relationship of:

$$Pi=M*Qi,$$

where Pi represents a matrix corresponding to coordinates of an i-th third position in the coordinates of the plurality of third positions, and Qi represents a matrix corresponding to coordinates of an i-th second position in the coordinates of the plurality of second positions, wherein Qi is expressed as:

$$Qi = \begin{bmatrix} x1i \\ y1i \\ z1i \\ 1 \end{bmatrix},$$

where x1i, y1i, and z1i represent the coordinates of the i-th second position, and Pi is expressed as:

$$Pi = \begin{bmatrix} x2i \\ y2i \\ z2i \\ 1 \end{bmatrix},$$

where x2i, y2i, and z2i represent the coordinates of the i-th third position.

8. The three-dimensional reconstruction method according to claim 6, wherein the intermediate coordinate system is a local Cartesian coordinates coordinate system, an origin of the local Cartesian coordinates coordinate system being average values of the coordinates of the plurality of first positions.

9. The three-dimensional reconstruction method according to claim 1, wherein said obtaining the coordinates of the plurality of first positions, in the geodetic coordinate system, of the image capturing device corresponding to the plurality of input images comprises:

reading a plurality of pieces of position data, which are recorded by the image capturing device at respective times when capturing the plurality of input images, and obtaining the coordinates of the plurality of first positions based on the plurality of pieces of position data.

10. The three-dimensional reconstruction method according to claim 9, wherein the plurality of pieces of position data is determined by a satellite positioning system.

11. The three-dimensional reconstruction method according to claim 1, wherein said constructing the reconstruction coordinate system based on the plurality of input images comprises:

determining a reference input image in the plurality of input images, wherein a number of input images among the plurality of input images which match the reference input image is maximal; and establishing the reconstruction coordinate system using coordinates of a first position corresponding to the reference input image as a coordinate origin, a first reference direction as a first coordinate axis, a second reference direction as a second coordinate axis, and a view direction corresponding to the reference input image as a third coordinate axis.

12. The three-dimensional reconstruction method according to claim 11, wherein said performing the three-dimensional reconstruction processing for the target object based on the reconstruction coordinate system, to obtain the first three-dimensional reconstruction model of the target object and the coordinates of the plurality of second positions, in the reconstruction coordinate system, of the image capturing device corresponding to the plurality of input images comprises:

performing, on the plurality of input images, the three-dimensional reconstruction processing for the target object using a three-dimensional reconstruction algorithm to obtain the first three-dimensional reconstruction model;

determining coordinates of a second position corresponding to the reference input image as an origin of the reconstruction coordinate system; and determining coordinates of second positions corresponding to remaining input images in the plurality of input images other than the reference input image based on position relationships between the remaining input images and the reference input image, wherein the coordinates of the plurality of second positions comprise the coordinates of the second position corresponding to the reference input image and the coordinates of the second positions corresponding to the remaining input images.

13. The three-dimensional reconstruction method according to claim 11, wherein said performing the three-dimensional reconstruction processing for the target object based on the reconstruction coordinate system, to obtain the first three-dimensional reconstruction model of the target object and the coordinates of the plurality of second positions, in the reconstruction coordinate system, of the image capturing device corresponding to the plurality of input images comprises:

performing, on the plurality of input images, the three-dimensional reconstruction processing for the target object using a three-dimensional reconstruction algorithm to obtain an intermediate three-dimensional reconstruction model;

normalizing the intermediate three-dimensional reconstruction model to obtain the first three-dimensional reconstruction model;

determining coordinates of a second position corresponding to the reference input image as an origin of the reconstruction coordinate system; and determining coordinates of second positions corresponding to remaining input images other than the reference input image in the plurality of input images based on position relationships between the remaining input images and the reference input image, wherein the first three-dimensional reconstruction model is located within a normalized cube region in the reconstruction coordinate system, the normalized cube region ranging from −1 to 1 on each of the first coordinate axis, the second coordinate axis, and the third coordinate axis of the reconstruction coordinate system, and wherein the coordinates of the plurality of second positions comprise the coordinates of the second position corresponding to the reference input image and the coordinates of the second positions corresponding to the remaining input images.

14. The three-dimensional reconstruction method according to claim 11, wherein the first reference direction is a horizontal direction, and wherein the second reference direction is a vertical direction.

15. The three-dimensional reconstruction method according to claim 1, further comprising:

determining an actual scale of at least part of the target object based on the second three-dimensional reconstruction model.

16. The three-dimensional reconstruction method according to claim 1, wherein the first three-dimensional reconstruction model is a three-dimensional point cloud model.

17. The three-dimensional reconstruction method according to claim 1, wherein the plurality of first positions has different coordinates from each other, and coordinates of each of the plurality of first positions are at a different angle relative to the target object from coordinates of another of the plurality of first positions, the coordinates of each of the plurality of first positions comprising a longitude, a latitude, and an altitude.

18. The three-dimensional reconstruction method according to claim 1, wherein the target object comprises a landmark building.

19. A three-dimensional reconstruction apparatus, comprising:

a memory configured to store computer-readable instructions in a non-transitory manner; and a processor configured to execute the computer-readable instructions, wherein the computer-readable instructions, when executed by the processor, implement the three-dimensional reconstruction method according to claim 1.

20. A non-transitory computer-readable storage medium, having computer-readable instructions stored thereon, wherein the computer-readable instructions, when executed by a processor, implement the three-dimensional reconstruction method according to claim 1.

* * * * *